OR 3,787,107

United States Patent [19]

Sick et al.

[11] 3,787,107

[45] Jan. 22, 1974

[54] SCANNER APPARATUS FOR OPTICALLY DISCERNIBLE CHARACTERS

[75] Inventors: Erwin Sick, Jcking; Gernot Pinior, Germering; Johann Plockl, Unterhaching, all of Germany

[73] Assignee: Zellweger AG Apparate und Maschinenfabrik Uster, Uster, Switzerland

[22] Filed: Jan. 28, 1972

[21] Appl. No.: 221,703

[30] Foreign Application Priority Data

Mar. 23, 1971 Switzerland........................ 4238/71

[52] U.S. Cl................... 350/7, 250/219 D, 250/223, 250/234, 350/285

[51] Int. Cl........................ G01n 21/30, G02b 17/00

[58] Field of Search... 250/219 D, 219 CR, 219 Q, 250/219 QA, 234, 223; 178/7.6; 235/61.11 E; 350/7, 285

[56] References Cited

UNITED STATES PATENTS

| | | | |
|---|---|---|---|
| 2,976,362 | 3/1961 | Stamps | 178/7.6 |
| 3,062,965 | 11/1962 | Sick | 350/7 X |
| 2,487,511 | 11/1949 | Bedford | 250/219 CR |
| 3,622,758 | 11/1971 | Schanne | 250/219 D |

*Primary Examiner*—James W. Lawrence
*Assistant Examiner*—T. N. Grigsby
*Attorney, Agent, or Firm*—Werner W. Kleeman

[57] ABSTRACT

A scanner apparatus for optically discernible characters, especially characters associated with an article and applied thereat or thereto, wherein a transmitted beam which on the basis of a rotary- or oscillating movement of a movable component of a beam deflecting mechanism which produces or further conveys a light beam scans about an axis of a reference plane. According to the invention a first cylindrical lens member is arranged between the reference plane and the movable component of the beam deflecting mechanism. This first cylindrical lens member extends in the scanning direction and images or portrays the surface of the beam deflecting member, which transmits the transmitted light beam at least when the transmitted light beam impinges perpendicularly upon the scanning track, within a depth of focus region which contains the reference plane.

7 Claims, 5 Drawing Figures

SCANNER APPARATUS FOR OPTICALLY DISCERNIBLE CHARACTERS

BACKGROUND OF THE INVENTION

The present invention relates to a new and improved scanner or scanning apparatus for optically discernible characters and, in particular, relates to a scanner apparatus for optically discernible characters which are associated with an article and preferably applied thereat or thereto. The articles may be of the type which are sold in a commercial establishment, such as for instance a supermarket or the like. The term "article" as used herein is employed in its broadest sense to encompass different types of goods, wares, products or the like which can have information applied directly or indirectly thereto.

The characters can represent information applicable to the relevant article, preferably in coded form. These characters are read by a reader or reading mechanism, the reading mechanism embodying a scanning or scanner apparatus and a receiver for light reflected by the character. A scanning apparatus or mechanism produces an optical transmitted beam of light which is periodically moved over the aforementioned character and produces thereat a scanning trace or track during each scanning operation. Light reflected by the character is taken-up by the receiver and converted into an electrical signal. This electrical signal contains information derived from the character scanned by the transmitted light beam. This electrical signal can be transmitted in known manner to a signal processing installation, typically a computer and evaluated in conventional manner. The result of such evaluation can relate, for instance, to the price of the article, the introduction of this article price into a calculation installation, the determination of the sale of different articles, the article numbers of which are portrayed by their associated character, preferably in coded form, or quite generally can serve for controlling the storage or warehouse supply, just to mention a few noteworthy possibilities.

Now with heretofore known state-of-the-art scanning equipment the transmitted beam is produced, for instance, with the aid of a beam deflecting device which, for instance, can contain a rotary- or oscillating component. Such rotary- or oscillating component can be, for instance, a prismatic mirror wheel, whereas a mirror of a galvanometer system can be utilized as the oscillating component. These known beam deflecting devices do not operate in an errorfree manner. For instance, notwithstanding constant rotational speed or oscillation frequency and uniformly moved characters there still arise non-parallel scanning traces, or the scanning traces from successive scanning operations exhibit irregular mutual spacing from one another or faulty sequence. Such errors or deviations are especially attributable to the so-called pyramid errors of the mechanical rotary- or oscillating component. In this connection there is to be understood the non-parallelism of the mirror or reflector surfaces of a mirror wheel with regard to its axis of rotation which can not be completely avoided even when fabricated with greatest precision, and the oscillating movement of a mechanical oscillating component about one or more axes which differ from the main oscillation axis of the system and which likewise can not be avoided. The pyramid errors produce a deviation of the light spot from its reference scanning trace, which light spot is produced by the transmitted beam scanning the character. This light spot deviation can lead to errors during character readout.

SUMMARY OF THE INVENTION

Hence, from what has been explained above it should be recognized that the art is still in need of a scanning apparatus for optically discernible characters which is not associated with the aforementioned drawbacks and limitations of the prior art constructions. Therefore, a primary objective of the present invention is to provide a new and improved construction of scanning apparatus for optically discernible characters which effectively and reliably fulfills the existing need in the art and is not associated with the aforementioned drawbacks and limitations of the state-of-the-art constructions.

Another objective of the present invention relates to a new and improved construction of scanning apparatus for optically discernible characters by means of which it is possible to extensively optically eliminate the previously considered pyramid errors.

Still a further significant object of the present invention relates to a scanning apparatus for optically discernible characters which is relatively simple in construction and design, economical to manufacture, and extremely reliable and accurate in its character scanning function.

Now, in order to implement these and still further objects of the invention which will become more readily apparent as the description proceeds, the inventive scanning apparatus for optically discernible characters, especially characters associated with an article and applied thereat or thereto, comprises means for generating a transmitted beam which on the basis of a rotary- or oscillating movement of a component which generates or further transmits a light beam and which component is part of a beam deflecting mechanism causes the transmitted beam to scan about an axis of a reference plane. Further, the invention contemplates the provision of a first cylindrical or cylinder lens member which extends in the scanning direction and is located between the reference plane and the rotary- or oscillating component of the beam deflecting mechanism. This cylinder lens member reproduces the surface of the beam deflecting mechanism which is imaged or portrayed by the transmitted beam at least when the transmitted beam impinges perpendicularly upon the scanning trace within a depth of focus containing the reference plane.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
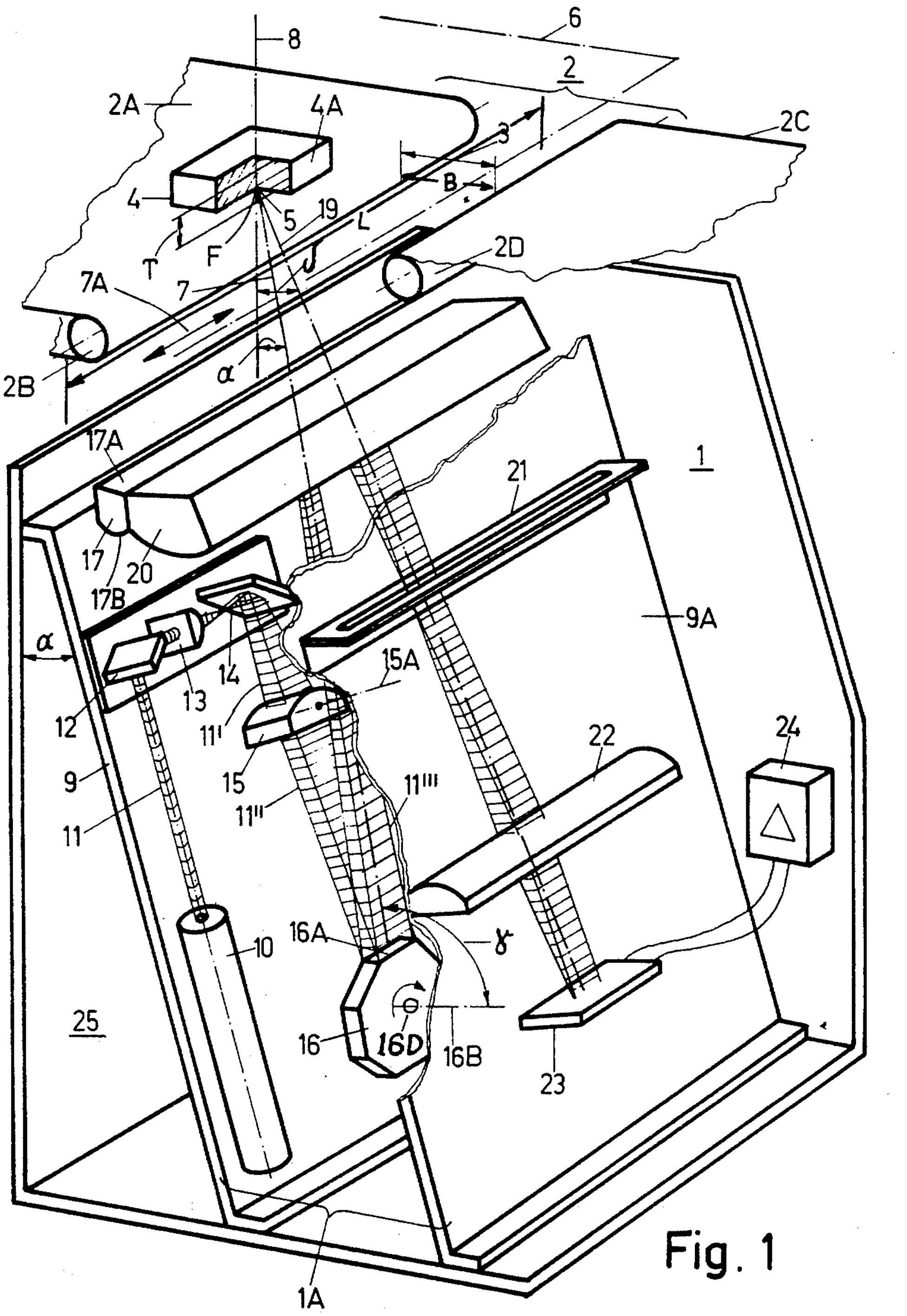
FIG. 1 is a simplified perspective view of a first embodiment of inventive scanner apparatus for optically discernible characters which has not been represented to scale.

Describing now the drawings, in FIG. 1 there is illustrated in simplified perspective view and not to scale an exemplary embodiment of inventive scanning or scanner apparatus for optically discernible characters. For the purpose of improving clarity in illustration certain of the components have only been schematically portrayed or partially illustrated. Turning then now more specifically to FIG. 1 there will be recognized a reading mechanism 1 which contains a scanning or scanner apparatus 1A constituting the subject matter of this development. In the embodiment under consideration the reader mechanism 1 is arranged for instance, beneath a conveying or conveyor mechanism 2. The conveyor mechanism 2 will be seen to be composed of a conveyor belt or band 2A which travels over a roller 2B as well as a further conveyor belt or band 2C which travels or is trained about a roller 2D. A character read-out gap or space 3 is present between both rollers 2B and 2D and between the conveyor bands 2A and 2C which travel over these respective rollers. The gap or space 3 possesses the width B in the direction of article conveying and the length L in a direction transverse thereto. This length L is preferably accommodated to the width of the conveyor bands 2A and 2C. The reading mechanism 1 is effective through the gap or space 3 and acts upon a character 5 applied to an article 4 transported on the conveyor mechanism 2, the character 5 preferably being applied to the bottom of such article 4.

At this point it might be remarked that instead of using the conveyor mechanism 2 it would be also possible to merely provide a plate which is arranged at the height of the conveyor bands 2A and 2C and at which there is provided the suitable space or gap 3. The articles 4 then can be moved automatically or manually over the gap 3.

In the ideal case the article character 5 moves in a reference plane 6 across the gap 3. In the showing of FIG. 1 this reference plane 6 has been schematically indicated by the phantom or chain-dot border lines.

Now the transmitted light beam 7 departs from a surface 17A of a first cylindrical or cylinder lens member 17 of the scanner apparatus 1A. This first cylindrical lens member 17 is arranged between the reference plane 6 and the movable i.e., rotary- or oscillating component 16C of the beam deflecting mechanism 16. This first cylindrical lens member 17 extends in the scanning direction indicated by the double-headed arrow 7A. Further, such first cylindrical lens member 17 images or reproduces the surface 16A, reproduced by the transmitted light beam 7, of the movable beam deflecting mechanism 16 at least when the transmitted beam 7 impinges perpendicularly at the scanning track or trace within a depth of focus or definition depth T containing the reference plane 6.

The first cylindrical lens member 17 is arranged substantially parallel to the reference plane 6 and its length is accommodated to the length L of the read-out gap 3 in such a manner that the light beam coming from the surface 16A portrayed by the transmitted light beam 7 will also then still impinge upon the cylindrical lens member 17 when the light spot produced by the transmitted light beam 7 has reached the terminal or end positions of the scanning track.

Figure 2:
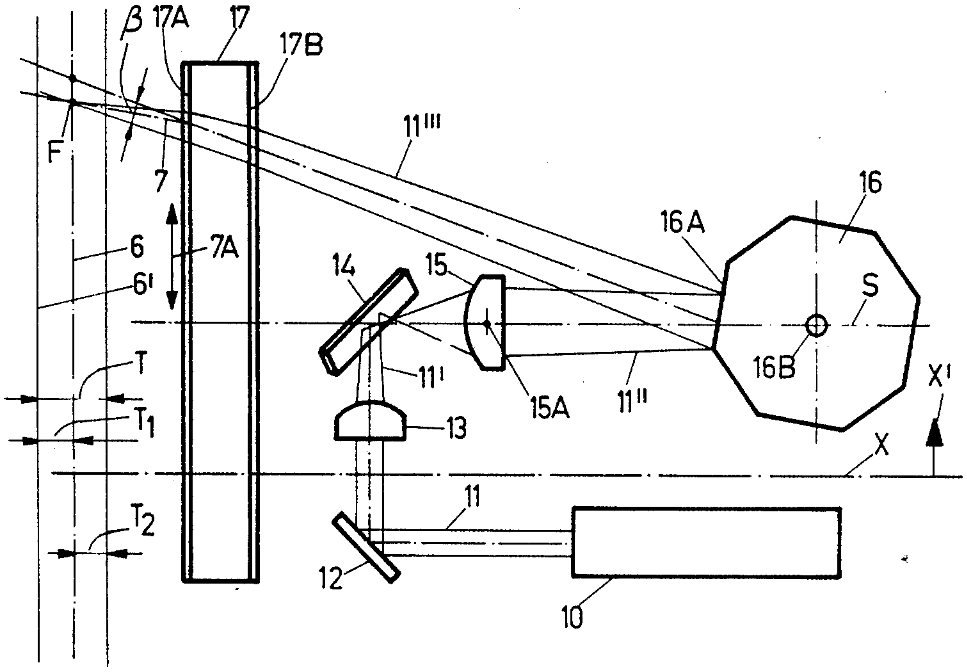
FIG. 2 is a plan view of the scanning apparatus depicted in FIG. 1.

FIG. 2 illustrates in plan view the inventive scanning or scanner apparatus 1A. A bundle or beam of light 11''' converging at the deflecting surface and emanating from a reflecting surface 16A of the beam deflecting mechanism 16 impinges upon the surface 17B of the cylindrical lens member 17 which confronts the beam deflecting mechanism 16. The transmitted light beam 7 departs from the cylindrical lens member 17 through the exit surface 17A confronting the reference plane 6. This beam of light 7 which serves for the scanning operation is focused at point F. In the illustrated embodiment the light bundle 11''' which forms the transmitted light beam 7 carries out a pivotal movement. It should be apparent from FIG. 2 that in so doing the focus point F moves through an arc during the course of a complete pivoting movement, thus does not always lie in the reference plane 6. It is important for the purpose of obtaining good scanning of the character 5 that the light spot produced by the transmitted light beam 7 upon the character 5 does not exceed a certain maximum dimension. This maximum dimension is determined by the structure or make-up of the character 5 which is to be read-out. The optical data of the scanning apparatus, especially also the cylindrical or cylinder lens member 17, are advantageously selected such that there is produced a sufficient depth of focus region or definition depth. This depth of focus region has been represented in FIG. 2 by reference character T, extends over the depth $T_1$ externally of the reference plane 6 and over the depth $T_2$ between the reference plane 6 and the cylindrical lens member 17. In order to be able to obtain sharp scanning of the character notwithstanding the arcuate shaped course of the focal or focusing point F over the entire depth of focus region T, it is advantageous when working with a pivoting or rocking light beam 11''' to carry out image-reproduction of the surface 16A in the central position not at the reference plane 6, rather in the portion $T_1$ of the depth of focus region T which faces away from the cylindrical lens member 17. It is particularly advantageous in the central position of the scanning beam 7 to permit image-reproduction to take place in the plane 6' of the depth of focus region T which is located furthest from the first cylindrical lens member 17.

Now for the purpose of realizing as large as possible depth of focus region or range T it is advantageous to make the spacing between the first cylindrical lens member 17 and the beam deflecting mechanism 16 as large as the spatial conditions of the scanning apparatus permit. In other words, it is advantageous to arrange for instance a first cylindrical lens member 17 at one end of the scanning apparatus 1A and to move or rotate the beam deflecting mechanism 16 at the opposite end.

The rotary- or oscillating axis 16B of the beam deflecting mechanism 16 is disposed at least approximately perpendicular to the lengthwise axis of the first cylindrical lens member 17.

Figure 3:
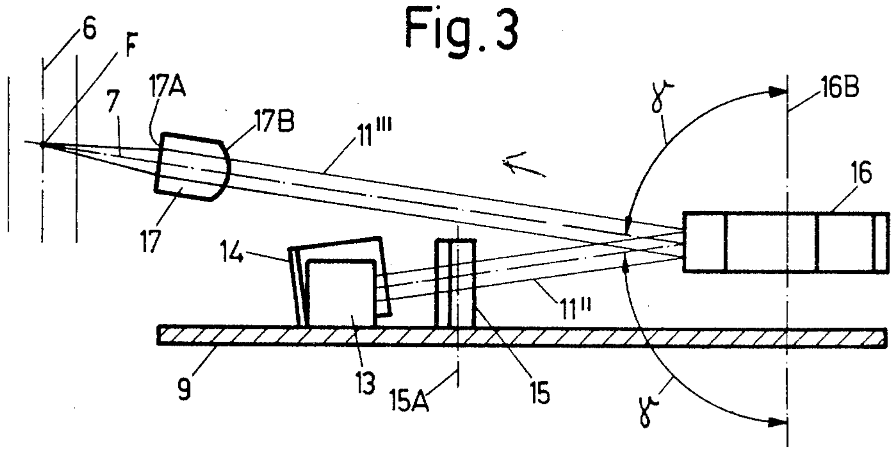
FIG. 3 is an elevational view of the inventive scanning or scanner apparatus, viewed from the plane X of FIG. 2 in the direction of the arrow X'.

The beam of light 11''' departing from the surface 16A of the beam deflecting mechanism 16 is produced by a light beam 11'' impinging upon the surface 16A and which emanates from a second cylindrical or cylinder lens member 15. The axis 15A of the second cylindrical lens member 15 is preferably disposed perpendicular to the lengthwise axis of the first cylindrical lens member 17. The beam of light 11'' coming from a slightly inclined deflecting mirror 14 and passing through the second cylindrical lens member 15 preferably encloses together with the rotary- or oscillating axis 16B of the beam deflecting mechanism 16 an angle $\gamma$ deviating somewhat from 90°. The same angle $\gamma$ is then located also between the departing light beam 11''' and the rotary- or oscillating axis 16B. In this manner there is achieved that the pivoting light beam 11''' will rock to and fro above or forwardly of the cylindrical lens member 15 without being disturbed or otherwise affected by the cylindrical lens member 15. The deviation of this angle from 90° is preferably chosen to be about 0.5° (cf. FIG. 3).

In view of the fact that the axes of the first and second cylindrical lens members 17 and 15 are disposed perpendicular to one another the scanning beam 7 converges perpendicular to the scanning direction 7A and does not produce a line-shaped light spot at the focus point or focus F rather a point-shaped light spot at the focus.

A first noteworthy advantage obtained through the use of cylindrical lenses resides in the fact that fabrication thereof with the required accuracy is much easier than for spherical lenses. Additionally, such type lenses are much less demanding with regard to their adjustment in the direction of their axis. A further advantage decisive for the present invention which is realized through the use of the first cylindrical lens member 17 resides in the fact that with the aid thereof it is possible to practically sufficiently eliminate the pyramid errors of the beam deflecting mechanism 16.

Owing to the aforementioned pyramid error of the beam deflecting mechanism 16 the light beam 11''' which departs therefrom has imparted thereto an impact, that is the light beam 11''' emanating from the successive mirror or reflector surfaces 16A do not all pass through the same deflecting surface. Consequently, these light beams move over different locations of the inlet surface 17B of the first cylindrical lens member 17. The first cylindrical lens member 17 possesses the characteristic that independent of these fluctuations the light beam 11''' arriving thereat will always be focused at the same focal or focus point F. In this way the otherwise harmful pyramid error is eliminated by optical means.

These considerations are also applicable in analogous manner when using an oscillating component at the beam deflecting device, for instance a galvanometer mirror.

A light beam 11' emanating from a third cylindrical lens member 13 and which is deflected through the agency of the deflecting mirror 14 through an angle of 90° is delivered to the second cylindrical lens member 15. Instead of using the cylindrical lens member 13 it would be also possible to employ a spherical lens.

A beam or bundle of light 11 emanating from a light source 10, preferably a laser, for instance a helium gas laser, is delivered through the agency of a further deflecting mirror 12 to the cylindrical lens member 13.

By means of the optical system consisting of the third cylindrical lens member 13, the deflecting mirror 14 and the second cylindrical lens member 15 the diameter of the beam of the original beam of light 11 is reduced to such an extent that together with the focusing carried out by the second and first cylindrical lens members 15 and 17 there appears a light spot at the scanning track which possesses sufficient fineness in consideration of the structure of the character 5 to be read. The focal length or distance of the first cylindrical lens member 17 is preferably selected to be between 50 and 150 millimeters.

The scanning apparatus 1A is advantageously constructed and arranged in such a manner that the transmitted light beam 7 impinges upon the reference plane 6 at an inclined angle $\alpha$ with respect to a perpendicular or normal 8 taken with regard to such reference plane, because in this manner specular or mirror reflections are extensively suppressed at the receiver portion of the reader or reading mechanism 1. This angle is preferably in the range of 10° – 45°. An angle of 15° has been found to be sufficient for suppressing specular reflections and particularly advantageous. The angle $\alpha$ can be, however, selected to be still greater, for instance 45°, whereby there is attained the further advantage that characters arranged at a side surface 4A of the article 4 (see FIG. 1), for instance a bar type code, can be read.

The use of the previously mentioned deflecting mirrors 12 and 14 is not an absolute prerequisite, however such use thereof permits the light beam path required for optical reasons between the light source 12 and the beam deflecting mechanism 16 to be accommodated within a relatively small space.

If the light source 10, for instance, a laser, already delivers a sufficiently fine, preferably parallel beam of light 11, the cross-section of which is sufficiently small, then with relatively coarse structure or make-up of the character 5 it is possible to dispense with the use of the optical system consisting of the lens members 13 and 15. The laser 10 is mounted upon a base or mounting plate 9 arranged at an inclination angle $\alpha$ and forming with the reader housing 50 a corner compartment 25 accommodating the drive of the movable beam deflecting mechanism, only the shaft 16D of which is visible, and capable of housing electronic components of the reader. Laser 10 preferably extends in parallelism with an edge of such base plate 9 which also has mounted thereat the 90°-deflecting mirror 12, the third cylinder lens member 13, the lengthwise axis of which is approximately perpendicular to such base plate, the further 90°-deflecting mirror 14, the second cylinder lens member 15, the axis 15A of which extends parallel to the axis of the lens member 13 and the beam deflecting mechanism 16.

Owing to the fan-like deflection of the light beam 11''' and the transmitted beam 7 the deflection of the scanning point along the scanning trace or track, especially towards both terminal positions, is no longer strictly linearly proportional to the lateral deflection angle of the beam deflecting mechanism 16. This error in linearity along the scanning track is somewhat reduced although not completely eliminated, by the beam offset angle $\beta$ prevailing between the main ray of the light bundle 11''' and the main ray or beam of the transmitted light beam 7 owing to the inclined through-passage through the first cylindrical lens member 17.

Figure 4:
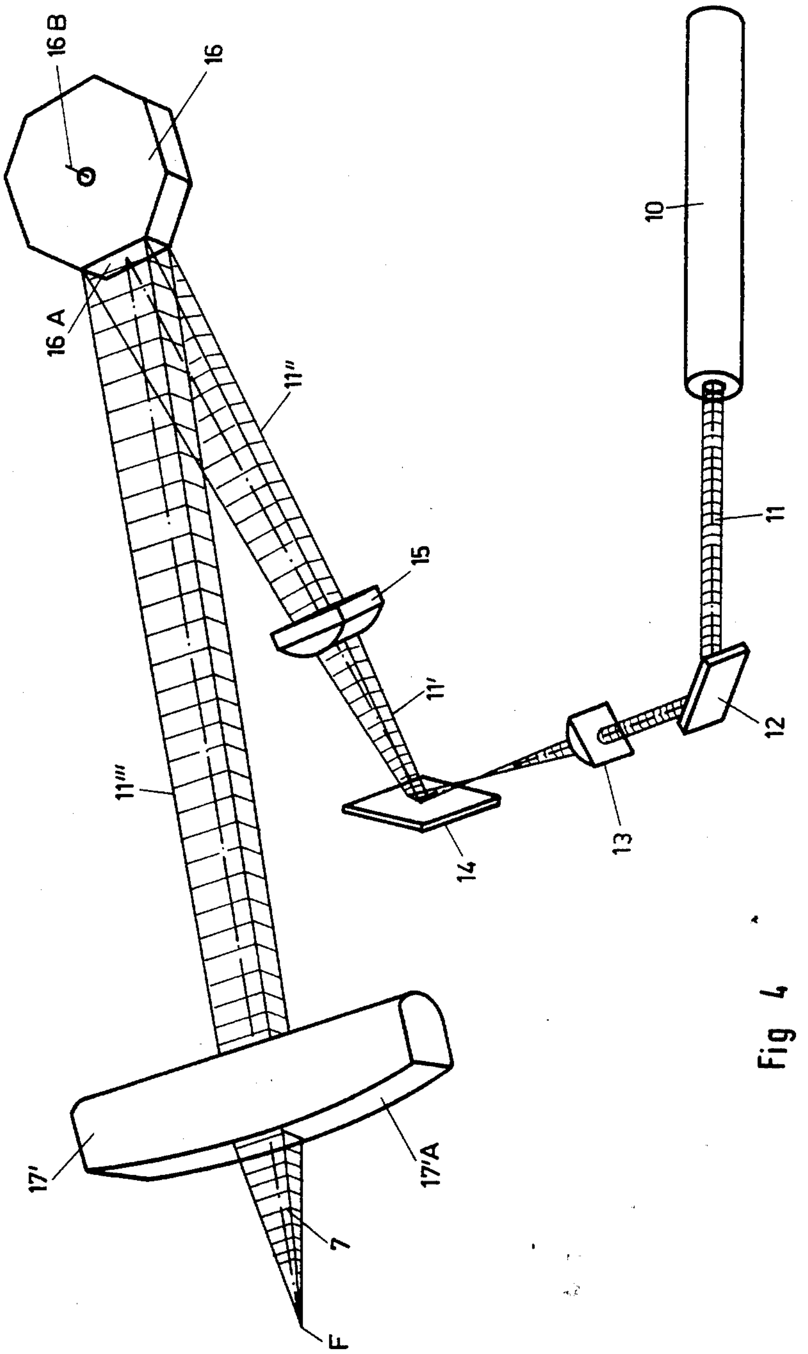
FIG. 4 is a plan view of the scanning apparatus depicted in FIG. 1 incorporating a curved cylindrical lens member.
Figure 5:
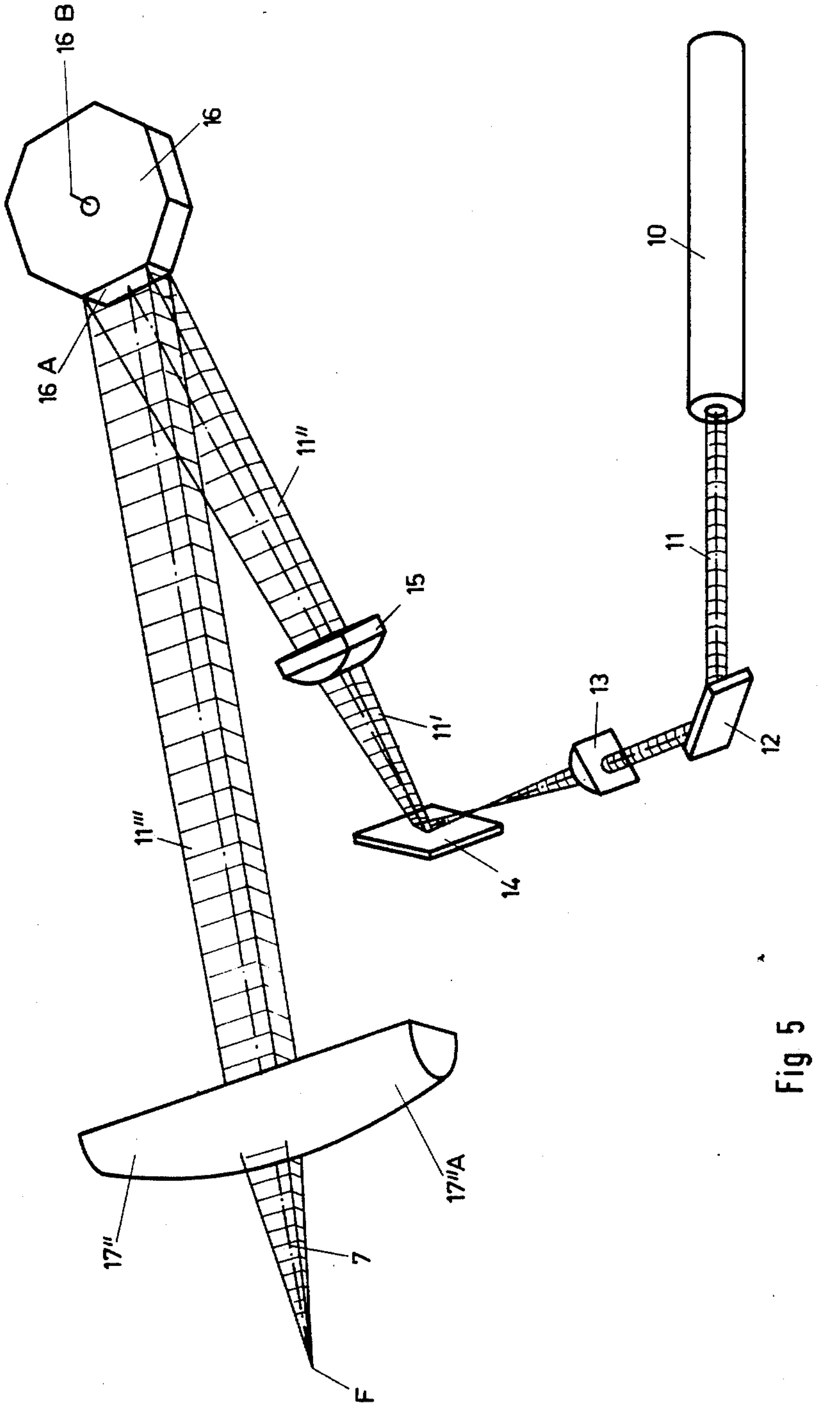
FIG. 5 is a plan view of the scanning apparatus depicted in FIG. 1 incorporating a torus-configured lens member.

This linear error could be even further reduced by means of a cylindrical lens member 17' curved in its lengthwise direction as depicted in FIG. 4. Finally, the first lens member could also have imparted thereto a toric or torus configuration, as indicated by the lens member 17'' of FIG. 5, so that it would be possible to achieve an almost complete correction of this linear error.

Additionally, it is to be remarked that the reading mechanism 1 contains a receiver component or receiver, for instance consisting of a further cylindrical lens member 20, as best seen by referring to FIG. 1. This cylindrical lens member 20 projects a received light beam or bundle 19 emanating from the light diffusely reflected at the article 4 and at the character 5 applied thereto, preferably through a diaphragm-like mechanism 21 and an image-reproducing system 22 upon a photoelectric transducer 23. The electrical output signal of the photoelectric transducer 23 can be advantageously delivered to a computer through the agency of amplifier 24. The components 21, 22 and 23 are mounted upon the plate 9A, as shown.

The received light bundle or beam 19 extends advantageously at an angle $\delta$ with regard to the perpendicular 8 taken with respect to the reference plane, this angle $\delta$ being greater than the previously mentioned angle $\alpha$.

While there is shown and described present preferred embodiments of the invention, it is to be distinctly understood that the invention is not limited thereto but may be otherwise variously embodied and practiced within the scope of the following claims. Accordingly,

What is claimed is:

1. A scanner apparatus for optically discernible characters, especially characters associated with an article and applied thereat or thereto, comprising a beam deflecting mechanism incorporating a movable component for projecting a transmitted light beam along a scanning track so as to scan an article about an axis of a reference plane, means for producing a transmitted light beam which is delivered to said beam deflecting mechanism, a first cylindrical lens member arranged between the reference plane and said movable component of said beam deflecting mechanism, said first cylindrical lens member extending in the direction of scanning, said first cylindrical lens member images at least that portion of that surface of the beam deflecting member which transmits the transmitted light beam within a definition depth containing the reference plane during such time at least when the transmitted light beam impinges perpendicularly upon the scanning track, the beam of light arriving at said movable component or transmitted therefrom encloses together with the axis of movement of said movable component an angle which deviates by about 0.5° from 90°.

2. A scanner apparatus for optically discernible characters, especially characters associated with an article and applied thereat or thereto, comprising a beam deflecting mechanism incorporating a movable component for projecting a transmitted light beam along a scanning track so as to scan an article about an axis of a reference plane, means for producing a transmitted light beam which is delivered to said beam deflecting mechanism, a first cylindrical lens member arranged between the reference plane and said movable component of said beam deflecting mechanism, said first cylindrical lens member extending in the direction of scanning, said first cylindrical lens member images at least that portion of that surface of the beam deflecting member which transmits the transmitted light beam within a definition depth containing the reference plane during such time at least when the transmitted light beam impinges perpendicularly upon the scanning track, a laser forming a light source, a base plate, said base having mounted thereat said laser, a 90°-deflecting mirror, a third cylindrical lens member having an axis disposed essentially perpendicular to said base plate, a further 90°-deflecting mirror, a second cylindrical lens member having an axis extending parallel to said third cylindrical lens member, and said beam deflecting mechanism, and wherein said first cylindrical lens member is secured to an edge of the base plate which is perpendicular to the laser axis and opposite said beam deflecting mechanism.

3. A scanner apparatus for optically discernible characters, especially characters associated with an article and applied thereat or thereto, comprising a beam deflecting mechanism incorporating a movable component for projecting a transmitted light beam along a scanning track so as to scan an article about an axis of a reference plane, means for producing a transmitted light beam which is delivered to said beam deflecting mechanism, a first cylindrical lens member arranged between the reference plane and said movable component of said beam deflecting mechanism, said first cylindrical lens member extending in the direction of scanning, said first cylindrical lens member images at least that portion of that surface of the beam deflecting member which transmits the transmitted light beam within a definition depth containing the reference plane during such time at least when the transmitted light beam impinges perpendicularly upon the scanning track, and wherein said first cylindrical lens member is curved for the purpose of compensating non-linearity of the path of the scanning point along the scanning track with respect to the associated angular range of the deflection of the transmitted light beam upon fan-like deflection of such transmitted light beam in the direction of the scanning track.

4. A scanner apparatus for optically discernible characters, especially characters associated with an article and applied thereat or thereto, comprising a beam deflecting mechanism incorporating a movable component for projecting a transmitted light beam along a scanning track so as to scan an article about an axis of a reference plane, means for producing a transmitted light beam which is delivered to said beam deflecting mechanism, a first lens member arranged between the reference plane and said movable component of said beam deflecting mechanism, said first lens member extending in the direction of scanning, said first lens member images at least that portion of that surface of the beam deflecting member which transmits the transmitted light beam within a definition depth containing the reference plane during such time at least when the transmitted light beam impinges perpendicularly upon the scanning track, and wherein said first lens member possesses a substantially torus configuration for the purpose of compensating non-linearity of the path of the scanning point along the scanning track with respect to the associated angular range of the deflection of the transmitted light beam upon fan-like deflection of such transmitted light beam in the direction of the scanning track.

5. A scanner apparatus for optically discernible characters, especially characters associated with an article and applied thereat or thereto, comprising a beam deflecting mechanism incorporating a movable component for projecting a transmitted light beam along a scanning track so as to scan an article about an axis of a reference plane, means for producing a transmitted light beam which is delivered to said beam deflecting mechanism, a first cylindrical lens member arranged between the reference plane and said movable component of said beam deflecting mechanism, said first cylindrical lens member extending in the direction of scanning, said first cylindrical lens member images at least that portion of that surface of the beam deflecting member which transmits the transmitted light beam within a definition depth containing the reference plane during such time at least when the transmitted light beam impinges perpendicularly upon the scanning track, and wherein the light beam arriving at said movable component of said beam deflecting mechanism is formed by a second cylindrical lens member, the axis of which is disposed perpendicular to the axis of said first cylindrical lens-member.

6. The scanner apparatus as defined in claim 5, further including a third cylindrical lens member, said second cylindrical lens member together with said third cylindrical lens member forming an image-reproduction system which consolidates a laser beam at the region of the reference plane into a point.

7. The scanner apparatus as defined in claim 6, wherein the transmitted light beam lies in a plane which together with the perpendicular taken with regard to the reference plane encloses an angle which differs from 0°, said angle which differs from 0° is in a range between 10° and 45°.

* * * * *